(12) United States Patent
Tripathi et al.

(10) Patent No.: US 7,623,538 B1
(45) Date of Patent: *Nov. 24, 2009

(54) HARDWARE-BASED NETWORK INTERFACE PER-RING RESOURCE ACCOUNTING

(75) Inventors: Sunay Tripathi, San Jose, CA (US); Nicolas G. Droux, San Jose, CA (US); Hsiao-Keng Jerry Chu, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 545 days.

This patent is subject to a terminal disclaimer.

(21) Appl. No.: 11/112,222

(22) Filed: Apr. 22, 2005

(51) Int. Cl.
*H04L 12/28* (2006.01)
*H04L 12/66* (2006.01)

(52) U.S. Cl. .................... 370/420; 370/463
(58) Field of Classification Search ............. 370/422, 370/389, 338, 400, 412, 396, 347, 395.53, 370/401, 403, 404, 405, 406, 409; 711/203–209
See application file for complete search history.

(56) References Cited

U.S. PATENT DOCUMENTS

| | | | |
|---|---|---|---|
| 5,909,564 A * | 6/1999 | Alexander et al. .......... 710/316 |
| 5,912,818 A * | 6/1999 | McGrady et al. ............ 700/232 |
| 6,041,053 A | 3/2000 | Douceur et al. |
| 6,070,219 A * | 5/2000 | McAlpine et al. ........... 710/263 |
| 6,163,539 A | 12/2000 | Alexander et al. |
| 6,477,643 B1 * | 11/2002 | Vorbach et al. ............. 713/100 |
| 6,600,721 B2 | 7/2003 | Edholm |
| 6,714,960 B1 | 3/2004 | Bitar et al. |
| 6,757,731 B1 | 6/2004 | Barnes et al. |
| 6,831,893 B1 | 12/2004 | Ben Nun et al. |
| 6,859,841 B2 | 2/2005 | Narad et al. |
| 6,944,168 B2 | 9/2005 | Paatela et al. |
| 7,046,665 B1 | 5/2006 | Walrand et al. |
| 7,177,311 B1 | 2/2007 | Hussain et al. |
| 7,260,102 B2 | 8/2007 | Mehrvar et al. |
| 7,313,142 B2 | 12/2007 | Matsuo et al. |
| 2002/0052972 A1 * | 5/2002 | Yim ........................... 709/245 |
| 2005/0135243 A1 | 6/2005 | Lee et al. |
| 2005/0138620 A1 | 6/2005 | Lewites |
| 2006/0041667 A1 | 2/2006 | Ahn et al. |
| 2006/0070066 A1 | 3/2006 | Grobman |
| 2006/0174324 A1 | 8/2006 | Zur et al. |

\* cited by examiner

*Primary Examiner*—Gregory B Sefcheck
*Assistant Examiner*—Nima Mahmoudzadeh
(74) *Attorney, Agent, or Firm*—Osha • Liang LLP

(57) ABSTRACT

Incoming/outgoing data packets to/from a network are processed by associated receive/send rings of a network interface. A plurality of counters, disposed in hardware, are each associated with particular receive/send rings. Each of the plurality of counters maintains a count of a number of data packets processed by an associated receive/send ring.

12 Claims, 6 Drawing Sheets

HARDWARE-BASED NETWORK INTERFACE PER-RING RESOURCE ACCOUNTING

CROSS-REFERENCE TO RELATED APPLICATIONS

The present application contains subject matter that may be related to the subject matter in the following U.S. applications filed on Apr. 22, 2005 and assigned to the assignee of the present application: "Method and Apparatus for Managing and Accounting for Bandwidth Utilization Within A Computing System" Ser. No. 11/112,367; "Method and Apparatus for Consolidating Available Computing Resources on Different Computing Devices" Ser. No. 11/112,368; "Assigning Higher Priority to Transactions Based on Subscription Level" Ser. No. 11/112,947; "Method and Apparatus for Dynamically Isolating Affected Services Under Denial of Service Attack" Ser. No. 11/112,158; "Method and Apparatus for Improving User Experience for Legitimate Traffic of a Service Impacted by Denial of Service Attack" Ser. No. 11/112,629; "Method and Apparatus for Limiting Denial of Service Attack by Limiting Traffic for Hosts" Ser. No. 11/112,328; "Dynamic Hardware Classification Engine Updating for a Network Interface"Ser. No. 11/112,934; "Network Interface Card Resource Mapping to Virtual Network Interface Cards" Ser. No. 11/112,063; "Network Interface Decryption and Classification Technique" Ser. No. 11/112,436; "Method and Apparatus for Enforcing Resource Utilization of a Container" Ser. No. 11/112,910; "Method and Apparatus for Enforcing Packet Destination Specific Priority Using Threads" Ser. No. 11/112,584; "Method and Apparatus for Processing Network Traffic Associated with Specific Protocols" Ser. No. 11/112,228; and "Method and Apparatus for Enforcing Bandwidth Utilization of a Virtual Serialization Queue" Ser. No. 11/112,322.

BACKGROUND OF INVENTION

In modern computing environments, computer systems are often required to communicate with other computer systems to perform any one or more of a vast number of different functions. Such communication may involve one computer system requiring the services or resources of another computer system. Referring to FIG. 1, in cases where multiple computer systems are not or cannot be directly and physically connected to one another due to, for example, being in different or remote locations, communication among multiple computer systems 10, 12, 14, 16, 18, 20 is facilitated by one or more networks 22 (e.g., the Internet) to which the multiple computer systems 10, 12, 14, 16, 18, 20 are operatively connected.

When a computer system sends data to a network for subsequent transmission to another computer system, that data is typically sent as numerous packets of data that can be universally recognized and handled by at least those networks that play a role in facilitating the transfer of that data between the computer systems (the propagation of packets in one or more networks hereinafter referred to generally as "network traffic"). A packet is typically formed of a header portion and a payload portion. The header portion may include information regarding, for example, an address of the sending system, an address of the desired receiving system, a size of the packet, a transport protocol used to transmit the packet, or other information identifying or characterizing the packet. The payload portion includes the actual data (e.g., data needed by the receiving system to perform a particular computation) to be transmitted from the sending system over the network to the receiving system.

To facilitate the sending and receiving of network traffic, a computer system typically includes or is otherwise connected to a network interface such as, for example, a hardware component known as a "network interface card" (NIC). FIG. 2 shows a typical computing environment having a "host" system 30 in operative connection with a network interface card 32. As shown in FIG. 2, the host system 30 includes a computing resource (e.g., a central processing unit (CPU), a temporary data structure) 34 that is operatively connected to the network interface card 32.

The network interface card 32, which is connected to a network 36, includes a classifier 38, receive rings (e.g., first-in, first-out queues) 40 that are each associated with a set of buffers, and send rings 42 used to transmit outgoing network traffic. Incoming network traffic is analyzed by the classifier 38 and assigned to one of the receive rings 40 based on, for example, an identification (e.g., an internet protocol (IP) address) or connection type (e.g., transmission control protocol (TCP)) of a particular packet.

Upon assignment by the classifier 38 of a particular packet to one of the receive rings 40, the packet is forwarded to that receive ring and a corresponding interrupt may be issued to the computing resource 34 to indicate the receipt of new data. Depending on, for example, a priority attributed to a particular receive ring, the computing resource 34 may instantiate a thread or use a current thread to retrieve the new data forwarded to that particular receive ring. In other cases, the computing resource 34 may not actively retrieve new data forwarded to a particular receive ring, and instead, may simply wait for new data to be processed through that particular receive ring.

SUMMARY OF INVENTION

According to one aspect of one or more embodiments of the present invention, a system comprises: a network interface operatively connected to a network and arranged to operatively propagate data packets from the network to a plurality of receive rings and from at least one send ring to the network; and a plurality of counters disposed in hardware and each associated with one of the plurality of receive rings, the plurality of counters each arranged to maintain a count of data packets processed by an associated one of the plurality of receive rings.

According to one aspect of one or more embodiments of the present invention, a method of processing network traffic in a host system comprises: receiving data packets from a network; classifying and routing the data packets to a plurality of receive rings in a network interface; propagating the data packets from the plurality of receive rings to the host system; and counting, in hardware, a number of data packets propagated from each of the plurality of receive rings.

According to one aspect of one or more embodiments of the present invention, a system comprises: a network interface card operatively connected to a network and a host system; a plurality of receive rings disposed on the network interface card and each arranged to receive a particular type of data packet from the network; and a plurality of counters disposed on the network interface card and each associated with at least one of the plurality of receive rings, each of the plurality of counters arranged to count a number of data packets processed by an associated one of the plurality of receive rings.

Other aspects and advantages of the invention will be apparent from the following description and the appended claims.

DETAILED DESCRIPTION

Figure 1:
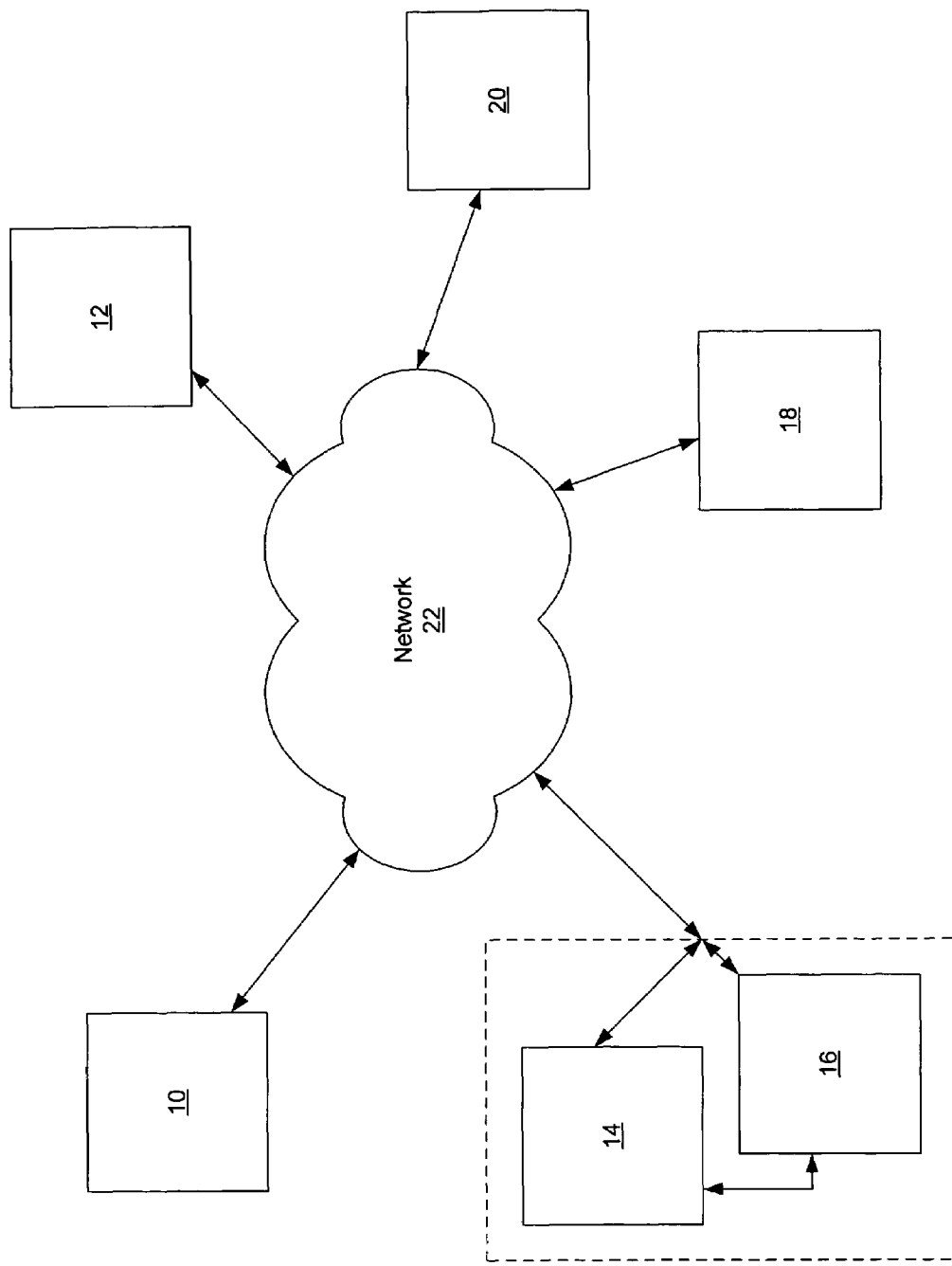
FIG. 1 shows a typical networked computing environment.
Figure 2:
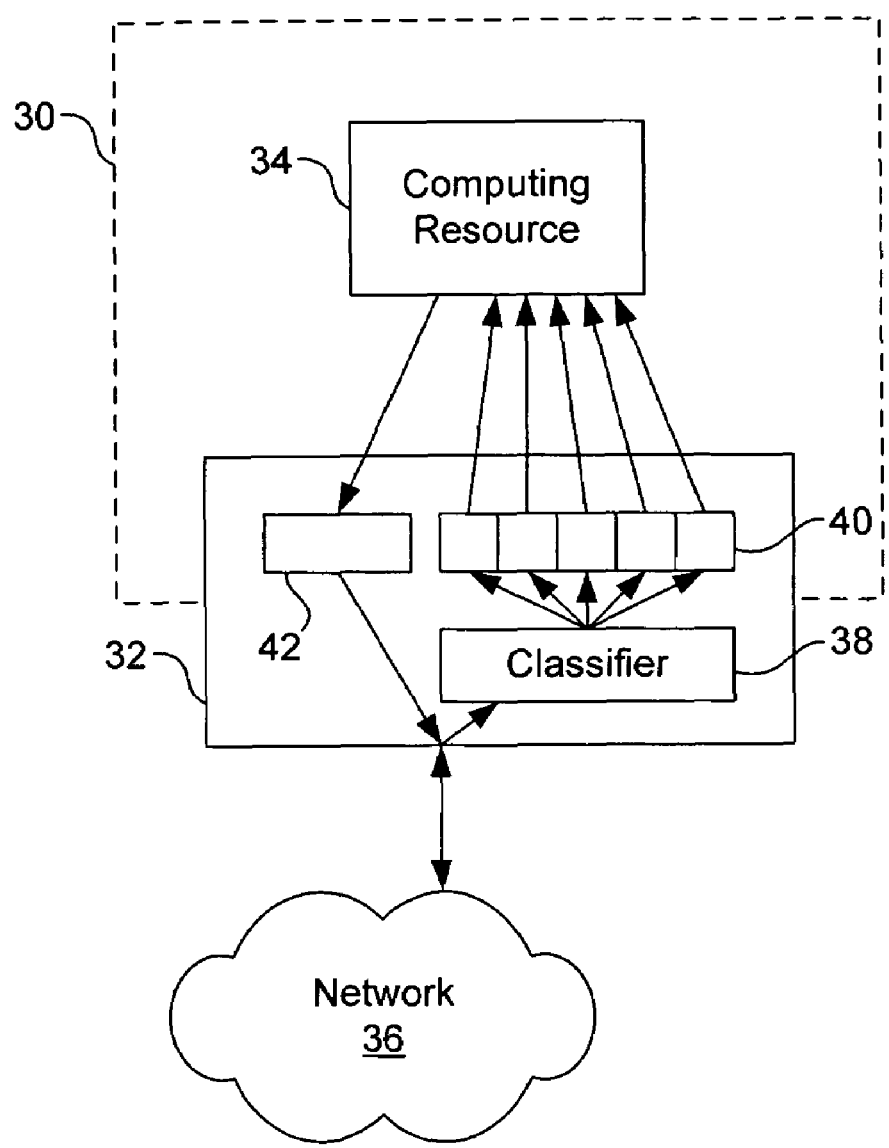
FIG. 2 shows a portion of a typical networked computing environment.

Exemplary embodiments of the present invention will be described with reference to the accompanying drawings. Like items in the drawings are shown with the same reference numbers. In the following description of the various embodiments of the present invention, numerous specific details are set forth in order to provide a more thorough understanding of the present invention. However, it will be apparent to one of ordinary skill in the art that the present invention may be practiced without these specific details. In other instances, well-known features have not been described in detail to avoid obscuring the description of the present invention.

Embodiments of the present invention relate to a technique for processing network traffic in a computing environment in which multiple computing resources share a network interface.

Figure 3:
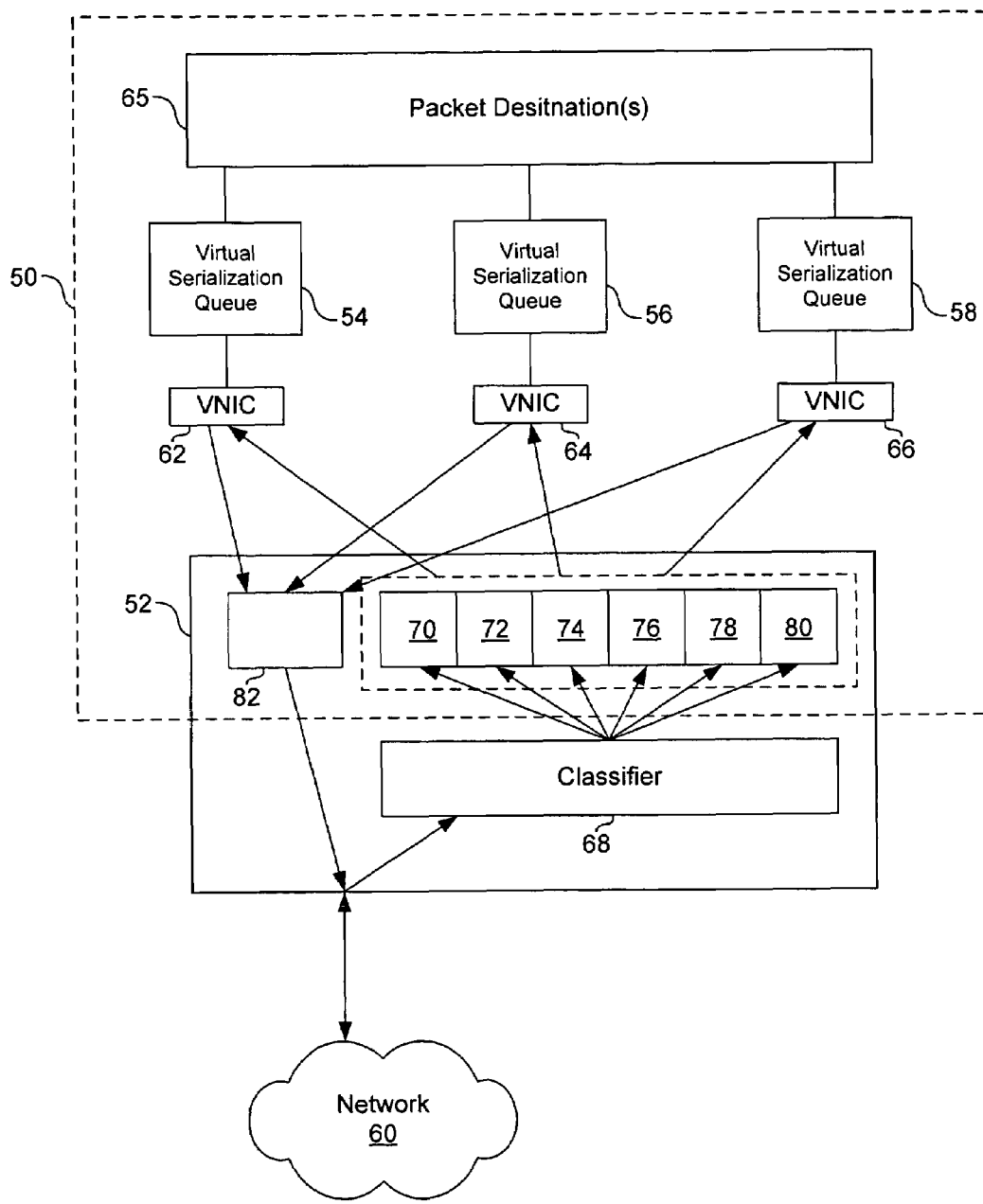
FIG. 3 shows a portion of a networked computing environment in accordance with an embodiment of the present invention.

FIG. 3 shows a portion of an exemplary computing environment in accordance with an embodiment of the present invention. In FIG. 3, a host system 50 is in operative connection with a network interface card 52. The host system 52 includes a plurality of virtual network interface cards 62, 64, 66 (each labeled in FIG. 3 as "VNIC") that are interfaced to a network (e.g., a local area network (LAN), a wide area network (WAN), a wireless network) 60 by the network interface card 52.

In one or more embodiments of the present invention, each virtual network interface card 62, 64, 66 is associated with at least one virtual serialization queue 54, 56, 58. Each serialization queue 54, 56, 58 corresponds to a data structure having at least two queues: an inbound queue and an outbound queue. Each of the queues within the virtual serialization queues 54, 56, 58 may be implemented as first-in, first-out (FIFO) queues. Further, each virtual serialization queue 54, 56, 58 may be configured to send and receive packets from associated virtual network interface cards 62, 64, 66. In addition, each virtual serialization queue 54, 56, 58 is configured to send and receive packets from one or more associated packet destinations (e.g., services, users, and/or containers of the host system 50) 65. Further, each virtual serialization queue 54, 56, 58 may be bound to a computing resource (e.g., a central processing unit (CPU)) (not shown) of the host system 50. Those skilled in the art will appreciate that any number of virtual serialization queues may be bound to a CPU. Further, those skilled in the art will appreciate that any number of virtual serialization queues may be bound to a virtual network interface card.

As described above, each of the plurality of virtual serialization queues 54, 56, 58 is respectively associated with a "virtual" network interface card 62, 64, 66 (each labeled in FIG. 3 as "VNIC"). The virtual network interface cards 62, 64, 66 provide an abstraction layer between the physical network interface card 52 and the various packet destinations (e.g., services, users, and/or containers of the host system 50) 65 present in the host system 50. In other words, each virtual network interface card 62, 64, 66 operates like a physical network interface card.

For example, in one embodiment of the present invention, each virtual network interface card 62, 64, 66 may be associated with one or more Internet Protocol (IP) addresses, one or more ports, and/or configured to handle one or more protocol types. Thus, while the host system 50 may be operatively connected to a single physical network interface card 52, packet destinations 65 in the host system 50 operate as if each packet destination has its own physical network interface card.

The network interface card 52, which is connected to the network 60, includes a classifier (e.g., a hardware classifier) 68, receive rings (e.g., first-in, first-out queues) 70, 72, 74, 76, 78, 80 that are each associated with a set of buffers, and send rings 82 used to transmit outgoing network traffic. Incoming network traffic is analyzed by the classifier 68 and assigned to one of the receive rings 70, 72, 74, 76, 78, 80 based on, for example, an identification (e.g., a destination/source internet protocol (IP) address) or connection type (e.g., transmission control protocol (TCP)) of a particular packet.

Those skilled in the art will note that in one or more embodiments of the present invention, a network interface may be implemented without a physical network interface card. For example, in one or more embodiments of the present invention, a network interface may be implemented in software.

As described above with reference to FIG. 3, in an embodiment of the present invention, a host system 50 is shared by multiple services, users, and/or containers. Thus, a single entity (e.g., a single service, a single container, or a single user) does not "own" the entire host system 50 or computing grid on which the host system 50 is implemented. Instead, there may be (i) multiple virtual machines running on the computing grid and/or (ii) multiple services, users, and/or containers sharing the same physical machine and network interface (e.g., network interface card 52).

At least partly because it is important to know how much network and/or computing resources are used to process the packets of a particular service, container, and/or user, in one or more embodiments of the present invention, a hardware-based accounting scheme is implemented. Specifically, in an embodiment of the present invention and as described below with reference to FIG. 4, a hardware-based accounting scheme for tracking service, user, and/or container use (and associated events) is implemented in a network interface card.

Figure 4:
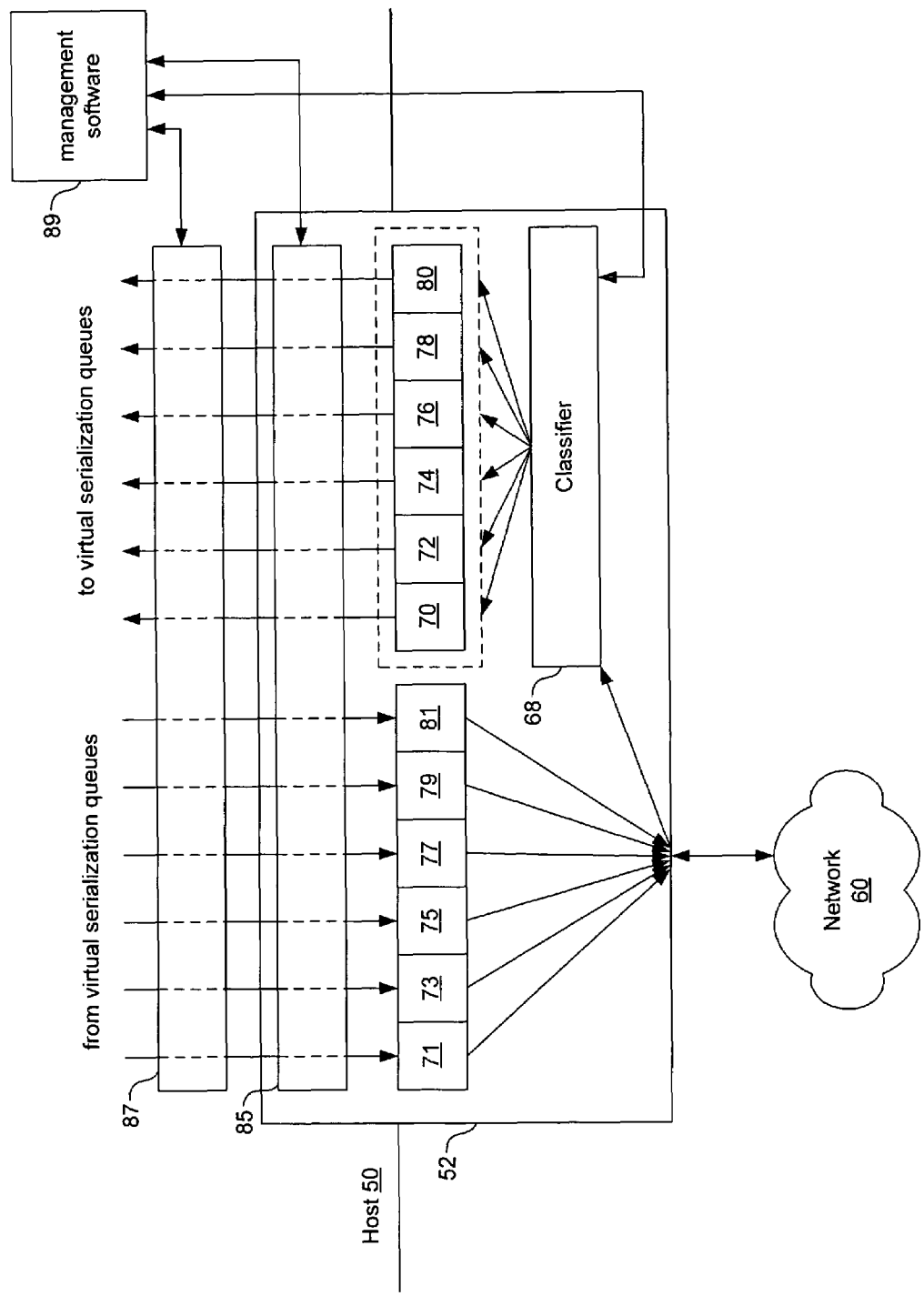
FIG. 4 shows a portion of a networked computing environment in accordance with an embodiment of the present invention.

FIG. 4, in accordance with an embodiment of the present invention, shows a portion of the portion of the networked computing environment shown in FIG. 3. As shown in FIG. 4, the network interface card 52 has a classifier 68 that routes network traffic from network 60 to particular receive rings 70, 72, 74, 76, 78, 80. The network interface card 52 also has a plurality of send rings 71, 73, 75, 77, 79, 81 used to propagate packets from a host system 50 to the network 60.

The network interface card 52 also has a plurality of counters 85 that are disposed between the network interface card 52 and a driver 87 of the host system 50. The plurality of counters 85 each track an amount of packets processed for each receive ring 70, 72, 74, 76, 78, 80 and each send ring 71, 73, 75, 77, 79, 81. However, in one or more other embodiments of the present invention, the plurality of counters 85 may track an amount of packets processed for some subset of the receive rings 70, 72, 74, 76, 78, 80 and the send rings 71, 73, 75, 77, 79, 81. For example, in an embodiment of the present invention, none of the plurality of counters 85 may be used to track an amount of packets processed for any of the send rings 70, 72, 74, 76, 78, 80.

The counts maintained by the plurality of counters 85 may be retrieved in any one or more of a variety of ways. In one embodiment of the present invention, information stored in the plurality of counters 85 may be read out at fixed intervals. In another embodiment of the present invention, a system daemon running at a particular priority may retrieve information stored in the plurality of counters 85 at fixed intervals. In another embodiment of the present invention, information stored in the plurality of counters 85 may be read out upon the occurrence of particular events. For example, if a denial-of-service attack is suspected, information stored in the plurality of counters 85 may be quickly read out or retrieved to establish a reference point for network activity.

Further, in one or more embodiments of the present invention, one or more of the receive rings 70, 72, 74, 76, 78, 80 may be mapped to particular containers, services, and/or users of the host system 50. Thus, by implementing the plurality of counters 85 to keep count of the packets processed by these one or more receive rings 70, 72, 74, 76, 78, 80, the network and/or computing resource usage of the particular containers, services, and/or users may be efficiently determined.

Based on information read out or retrieved from the plurality of counters 85, remedial, responsive, and/or corrective action may be taken. For example, in one embodiment of the present invention, if management software 89 to which counter information is supplied determines that resource utilization is not at a desired or optimal level, the management software 89 may dynamically reprogram the classifier 68 (and/or, for example, the driver 87) so as to effect a change in the routing of incoming network traffic to particular receive rings 70, 72, 74, 76, 78, 80, and hence, to particular virtual serialization queues (e.g., 54, 56, 58 shown in FIG. 3) and packet destinations (e.g., services, containers, and/or users of the host system 50).

In one or more embodiments of the present invention, the count values of one or more counters disposed on a network interface card may be selectively and/or periodically reset. Further, in one or more embodiments of the present invention, the count values of one or more counters disposed on a network interface card may be selectively and/or periodically set to a particular non-zero value.

Figure 5:
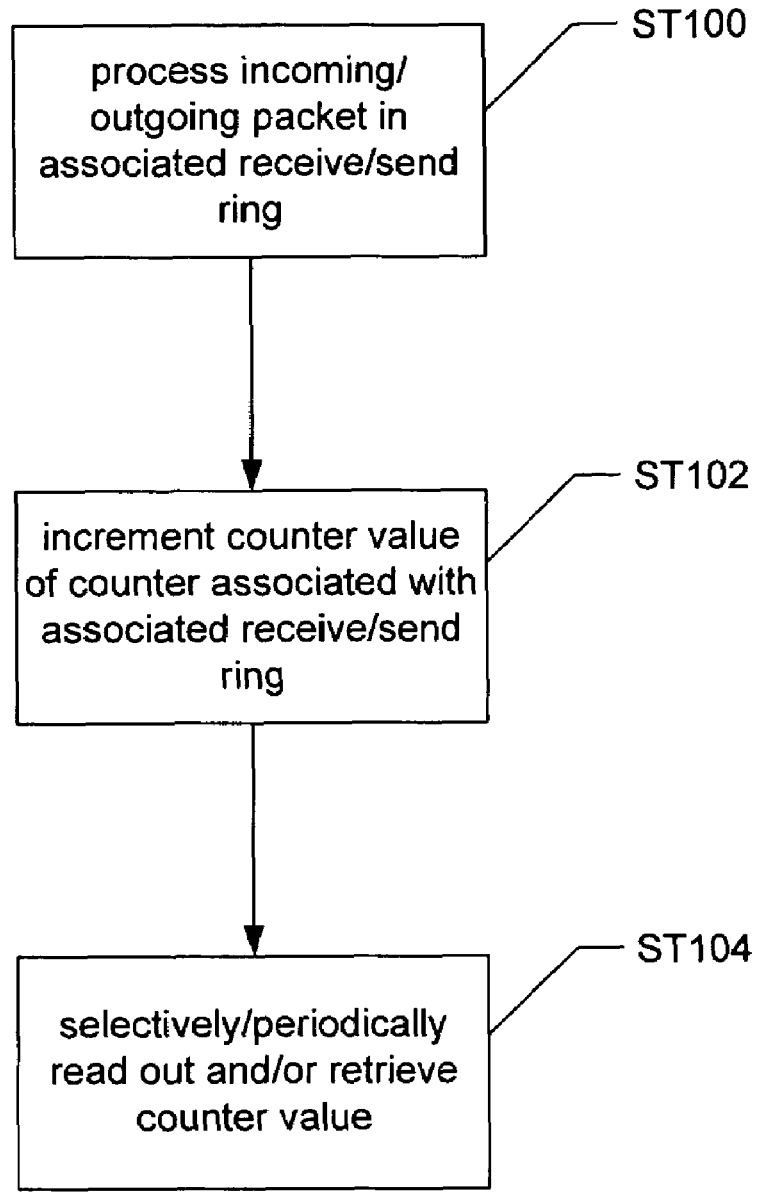
FIG. 5 shows a flow process in accordance with an embodiment of the present invention.

FIG. 5 shows an exemplary flow process in accordance with an embodiment of the present invention. As shown in FIG. 5, an incoming/outgoing packet is processed by an associated receive/send ring ST100. Upon processing (i.e., for incoming packet, when packet leaves receive ring to a driver (e.g., driver 87 shown in FIG. 4); for outgoing packet, when packet is received at send ring from the driver (e.g., driver 87 shown in FIG. 4)) of the incoming/outgoing packet, a counter associated with the associated receive/send ring is incremented ST102. Thereafter, a counter value of the counter may be selectively and/or periodically read out and/or retrieved ST104.

Figure 6:
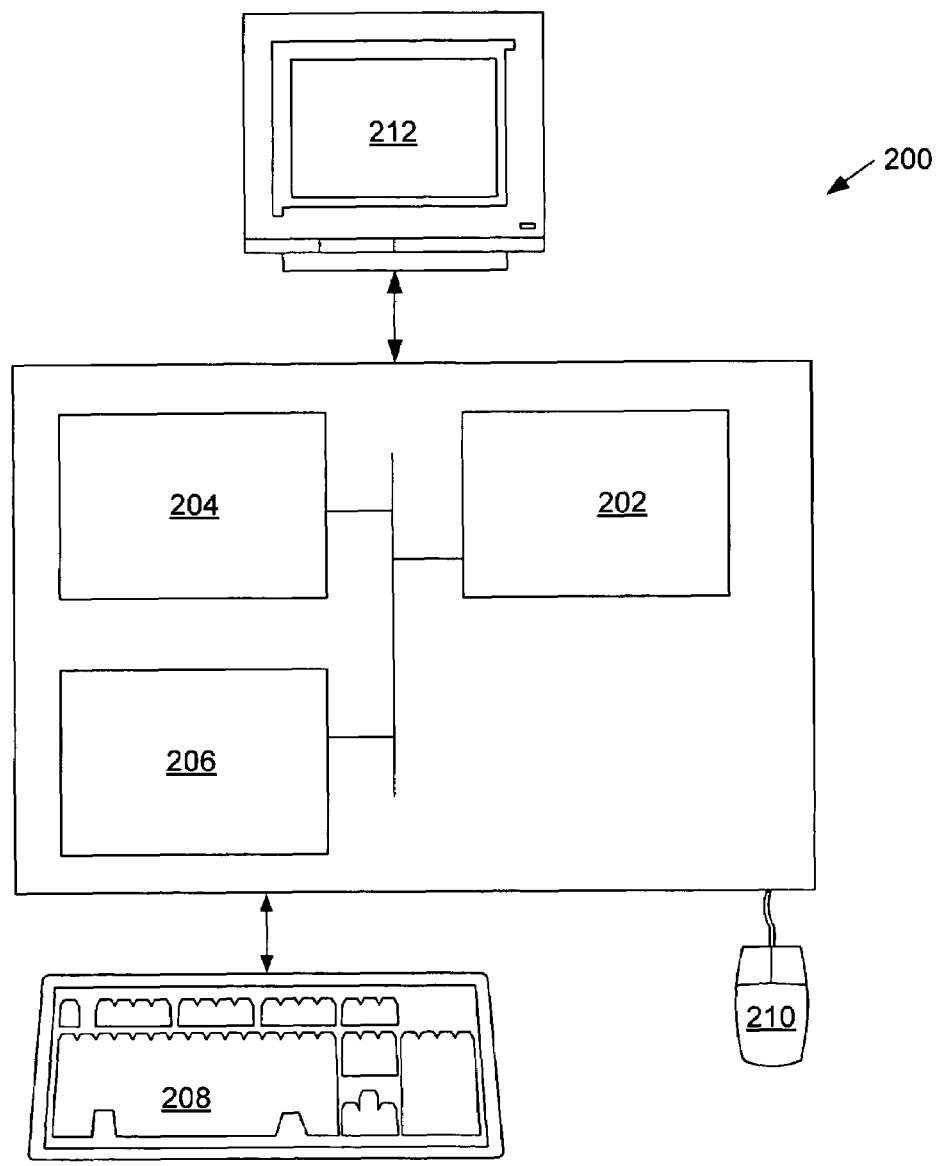
FIG. 6 shows a computer system in accordance with an embodiment of the present invention.

An embodiment of the present invention may be associated with virtually any type of computer system regardless of the platform being used. For example, as shown in FIG. 6, a networked computer system 200 includes a processor 202, associated memory 204, a storage device 206, and numerous other elements (not shown) and functionalities typical of modern computer systems. The networked computer system 200 may also include input means, such as a keyboard 208 and a mouse 210, and output means, such as a monitor 212. The networked computer system 200 is connected to a local area network (LAN) or a wide area network via a network interface connection (not shown). Those skilled in the art will appreciate that these input and output means may take other forms. Further, those skilled in the art will appreciate that one or more elements of the networked computer system 200 may be remotely located and connected to the other elements over a network. Further, software instructions to perform embodiments of the invention may be stored on a computer readable medium such as a compact disc (CD), a diskette, a tape, a file, or any other computer-readable storage device.

Advantages of the present invention may include one or more of the following. In one or more embodiments of the present invention, an amount of packets processed by a given network interface hardware resource may be tracked in hardware.

In one or more embodiments of the present invention, by accounting for the use of network interface hardware resources on a per-ring basis, resource utilization of services, users, and/or containers in a shared network environment may be determined.

In one or more embodiments of the present invention, because resource utilization of services, users, and/or containers in a shared network environment may be determined using counters implemented in hardware, action may be taken to improve the performance of the shared network based on information stored in the counters.

In one or more embodiments of the present invention, because event tracking is implemented in hardware, adverse effects of software-based tracking may be avoided.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
    a physical network interface card operatively connected to a network and arranged to operatively propagate data packets from the network to a plurality of receive rings and from at least one send ring to the network;
    a plurality of counters disposed in the physical network interface card and each associated with one of the plurality of receive rings, the plurality of counters each arranged to maintain a count of data packets processed by an associated one of the plurality of receive rings; and
    a host system, operatively connected to the physical network interface card, comprising a plurality of virtual serialization queues and a plurality of virtual network interface cards operatively connected to the plurality of virtual serialization queues, wherein each of the plurality of virtual network interface cards is associated with a distinct internet protocol (IP) address, and wherein each of the plurality of virtual network interface cards is associated with at least one of the plurality of receive rings.

2. The system of claim 1, the physical network interface card comprising a classifier operatively connected to the network, wherein the classifier uses a first routing configuration to route data packets to the plurality of receive rings.

3. The system of claim 1, further comprising:
a driver operatively connected to the plurality of receive rings and the at least one send ring.

4. The system of claim 1, further comprising:
at least one other counter disposed in the physical network interface card and associated with the at least one send ring, the at least one other counter arranged to maintain a count of data packets processed by the at least one send ring.

5. The system of claim 2, wherein the host is configured to reprogram the classifier using the count of data packets.

6. The system of claim 5, where in reprogramming the classifier comprises modifying the first routing configuration to obtain a second routing configuration using the count of data packets, wherein the second routing configuration is used to route data packets to the plurality of receive rings.

7. The system of claim 1, wherein at least one of the plurality of virtual serialization queues is associated with at least one of a user, service, and container of the system.

8. The system of claim 1, wherein information stored in at least one of the plurality of counters is one of read out and retrieved periodically.

9. The system of claim 1, wherein information stored in at least one of the plurality of counters is one of read out and retrieved selectively.

10. A method of processing network traffic in a host system, comprising:
receiving data packets from a network;
classifying and routing the data packets to a plurality of receive rings in a network interface card, wherein the classification is performed by a classifier using a first routing configuration;
propagating the data packets from the plurality of receive rings to the host system, wherein the host system comprises a plurality of virtual serialization queues and plurality of virtual network interface cards operatively connected to the plurality of virtual serialization queues, wherein each of the plurality of virtual network interface cards is associated with a distinct internet (IP) address, and wherein each of the plurality of virtual network interface cards is associated with at least one of the plurality of received rings;
counting, in hardware the network interface card, a number of data packets propagated from each of the plurality of receive rings;
modifying, based on the counting, the first routing configuration to obtain a second routing configuration; and
classifying and routing the data packets to the plurality of receive rings in the network interface card, wherein the classification is performed by the classifier using the second routing configuration.

11. The method of claim 10, further comprising:
receiving data packets from the host system;
routing the data packets received from the host system to at least one send ring; and
counting, in hardware, a number of data packets propagated from the at least one send ring.

12. The method of claim 10, further comprising:
at least one of periodically and selectively retrieving information based on the counting.

* * * * *

UNITED STATES PATENT AND TRADEMARK OFFICE
CERTIFICATE OF CORRECTION

PATENT NO. : 7,623,538 B1
APPLICATION NO. : 11/112222
DATED : November 24, 2009
INVENTOR(S) : Tripathi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 834 days.

Signed and Sealed this

Twenty-sixth Day of October, 2010

David J. Kappos
*Director of the United States Patent and Trademark Office*